US008755183B2

(12) United States Patent
Gu et al.

(10) Patent No.: US 8,755,183 B2
(45) Date of Patent: Jun. 17, 2014

(54) CAR ELECTRIC EQUIPMENT CASE MODULE

(75) Inventors: Huan-Lung Gu, Hualien County (TW); Jyh-Chun Chang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 35 days.

(21) Appl. No.: 13/197,729

(22) Filed: Aug. 3, 2011

(65) Prior Publication Data

US 2012/0293956 A1    Nov. 22, 2012

(30) Foreign Application Priority Data

May 17, 2011    (TW) .............................. 100117232 A
Jul. 19, 2011    (TW) .............................. 100125463 A (51) Int. Cl.
*H05K 7/20*    (2006.01)
(52) U.S. Cl.
USPC ........... 361/695; 361/690; 361/691; 361/692; 361/694; 454/184
(58) Field of Classification Search
None
See application file for complete search history.

(56) References Cited

U.S. PATENT DOCUMENTS

| | | | | |
|---|---|---|---|---|
| 6,445,582 B1 * | 9/2002 | Oda et al. | ...................... | 361/695 |
| 6,662,891 B2 * | 12/2003 | Misu et al. | .................... | 180/68.1 |
| 6,876,548 B2 * | 4/2005 | Yatougo et al. | ............... | 361/690 |
| 7,177,148 B2 * | 2/2007 | Nakata et al. | ................. | 361/695 |
| 7,642,013 B2 | 1/2010 | Howard et al. | | |
| 7,690,464 B2 | 4/2010 | Yustick et al. | | |
| 7,764,496 B2 * | 7/2010 | Nguyen et al. | ................ | 361/697 |
| 7,807,284 B2 | 10/2010 | Marukawa et al. | | |
| 7,869,214 B2 * | 1/2011 | Blank et al. | ..................... | 361/695 |
| 7,998,610 B2 * | 8/2011 | Fujii | ............................. | 429/120 |
| 8,351,014 B2 * | 1/2013 | Dunn | ............................ | 349/161 |
| 8,403,736 B2 * | 3/2013 | Rasmussen et al. | .......... | 454/184 |

FOREIGN PATENT DOCUMENTS

TW                456726           9/2001
(Continued)

OTHER PUBLICATIONS

A.A. Pesaran et al., "An Approach for Designing Thermal Management Systems for Electric and Hybrid Vehicle Battery Packs", National Renewable Energy Laboratory, NREL/CP-540-25992, Jan. 14, 1999, p. 1-p. 18.

(Continued)

*Primary Examiner* — Boris Chervinsky
(74) *Attorney, Agent, or Firm* — Jianq Chyun IP Office (57) ABSTRACT

A car electric equipment case module includes a housing, a covering structure, an electric equipment set, and a fan. The housing has a side wall, a containing space containing the electric equipment set and a first ventilator formed on the side wall. The covering structure includes a casing assembled to the housing and a block wall connected to the casing and extending outside the side wall to cover the first ventilator. An air channel connected the first ventilator is formed between the block wall and the side wall. The fan configured in the housing provides an air flow. The air flow flows into the containing space through the air channel and the first ventilator and flows out through a second ventilator formed on the covering structure, or flows into the containing space through the second ventilator and flows out through the first ventilator and the air channel.

9 Claims, 5 Drawing Sheets

(56) References Cited

FOREIGN PATENT DOCUMENTS

| TW | M246851 | 10/2004 |
| TW | 200612594 | 4/2006 |
| TW | M354528 | 4/2009 |
| TW | M366407 | 10/2009 |
| TW | M372796 | 1/2010 |
| TW | M380896 | 5/2010 |
| TW | M384780 | 7/2010 |
| TW | M391730 | 11/2010 |
| TW | M392768 | 11/2010 |

OTHER PUBLICATIONS

K.J. Kelly et al., "Battery Usage and Thermal Performance of the Toyota Prius and Honda Insight for Various Chassis Dynamometer Test Procedures", National Renewable Energy Laboratory, NREL/CP-540-31306, Nov. 1, 2001, p. 1-p. 9.

Matthew Zolot et al., "Thermal Evaluation of Toyota Prius Battery Pack", National Renewable Energy Laboratory, NREL/2002-01-1962, Sep. 1, 2002, p. 1-p. 9.

Gi-Heon Kim et al., "Analysis of Heat Dissipation in Li-Ion Cells & Modules for Modeling of Thermal Runaway", National Renewable Energy Laboratory, NREL/PR-540-41531, May 15, 2007, p. 1-p. 29.

* cited by examiner

CAR ELECTRIC EQUIPMENT CASE MODULE

CROSS-REFERENCE TO RELATED APPLICATION

This application claims the priority benefits of Taiwan application serial no. 100117232, filed on May 17, 2011, and Taiwan application serial no. 100125463, filed on Jul. 19, 2011. The entirety of each of the above-mentioned patent applications is hereby incorporated by reference herein and made a part of this specification.

TECHNICAL FIELD

The disclosure relates to a car electric equipment case module.

BACKGROUND

In an electric vehicle system, a battery pack is normally encased in a battery case with high structural rigidity to form a battery pack case that ensures the connection and protection of components in the battery pack case. Further, the entire battery pack case has sufficient rigidity and can be firmly fixed to the frame of the electric vehicle. Besides, a controller for propulsion of a motor of the electric vehicle has a circuit board that is required to be installed in a controller case. The battery pack case and the controller case are electric equipment case sets that aim at isolating the electric equipment sets therein, protecting the electric equipment sets against water infiltration or dust, and preventing the electric equipment sets from damages or short circuit.

The maximum operating temperature of the battery pack and the circuit board in the low-power electric vehicle can be set under safety control, and therefore a compulsory cooling mechanism is not required in most cases. The electric equipment case can even dissipate heat by itself due to air convection. Hence, the electric equipment case can have a closed structure and thereby easily achieve water-proof and dust-proof protection. However, with the development of electric vehicle technology, the electric vehicle is required to generate power to a greater extent and have prolonged cruising range, and thus the battery of the electric vehicle needs to have the increasing power, which leads to an increase in the temperature. Moreover, due to the significant power consumption of the motor in a high-power electric vehicle system, high-power components are required by the control circuit board for propelling the motor, thus raising the temperature of the system. Accordingly, the battery case and the controller case in the high-power electric vehicle system necessitate the advanced heat-dissipating and cooling mechanism in case that the overheated components are damaged or even endanger the drivers.

The forced air cooling achieves favorable cooling effects and costs less than the water cooling. Hence, the forced air cooling is applicable to the car electric equipment case set. In order to have the heat-dissipating air flow into or flow out of the electric equipment case in an unrestrained manner for dissipating heat of the electric equipment set in the electric equipment case, at least one air intake and at least one air exhaust need to be configured on the electric equipment case. Nonetheless, water that results from rain, splash driving, or car wash is likely to enter the electric equipment case through the air intake or the air exhaust thereon, and thereby the electric equipment set in the electric equipment case may be damaged. The foreign material, e.g., dust, may also enter the electric equipment case through the air intake or the air exhaust and contaminate the electric equipment set in the electric equipment case.

SUMMARY

The disclosure provides a car electric equipment case module that can achieve favorable water-proof and dust-proof protection.

In an exemplary embodiment of the disclosure, a car electric equipment case module that includes a housing, a covering structure, an electric equipment set, and a fan is provided. The housing has a side wall, a containing space and a first ventilator formed on the side wall. The covering structure includes a first casing and a first block wall. The first casing is assembled to the housing. The first block wall is connected to the first casing and extends outside the side wall to cover the first ventilator. There is a gap between the first block wall and the side wall to form a first air channel connected to the first ventilator. A second ventilator is formed on the housing or the covering structure. The electric equipment set is configured in the containing space. The fan is configured in the housing and suitable for providing an air flow. The air flow flows into the containing space through the air channel and the first ventilator and flow out through the second ventilator, or flows into the containing space through the second ventilator and flows out through the first ventilator and the air channel.

Based on the above, the car electric equipment case module described in the exemplary embodiments of the disclosure has the covering structure that is connected to the housing, the air channel is formed between the covering structure and the housing, and the covering structure covers the ventilator. Thereby, the air flow can flow into or flow out of the housing through the air channel and the ventilator for heat dissipation. Besides, since the covering structure covers the ventilator, the housing can be protected from external moisture or dust that enters the housing through the ventilator. As such, the electric equipment set in the housing is less likely to be in contact with the foreign material and is thus not damaged or ineffective.

Several exemplary embodiments accompanied with figures are described in detail below to further describe in the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
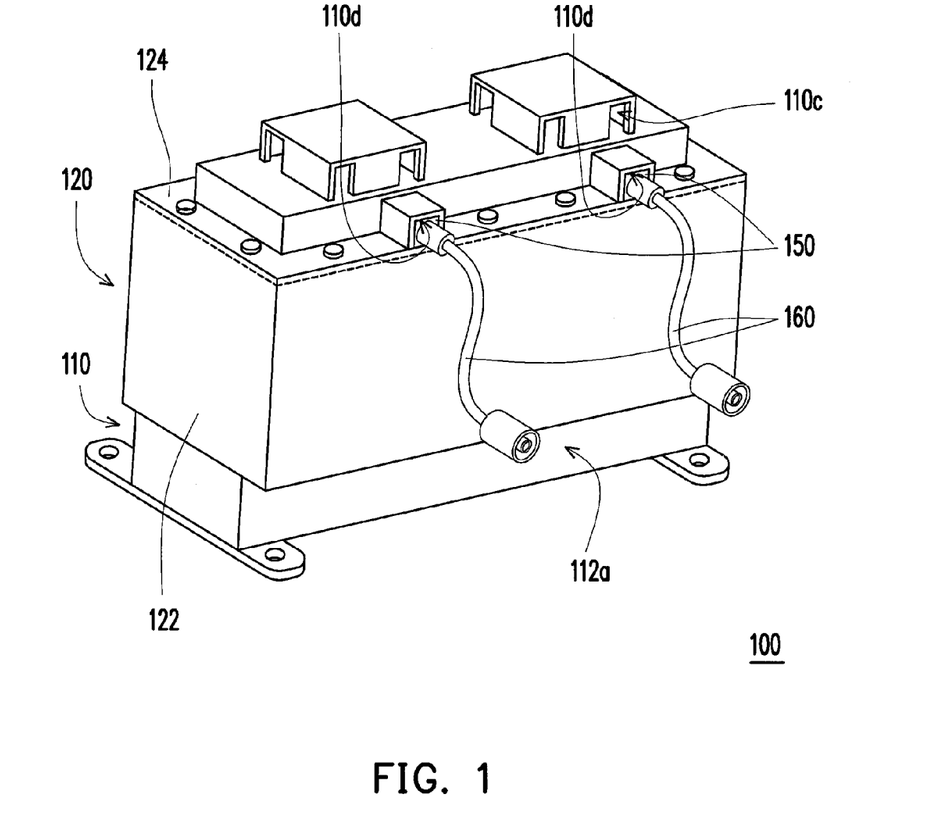
FIG. 1 is a three-dimensional view illustrating a car electric equipment case module according to an exemplary embodiment of the disclosure.
Figure 2:
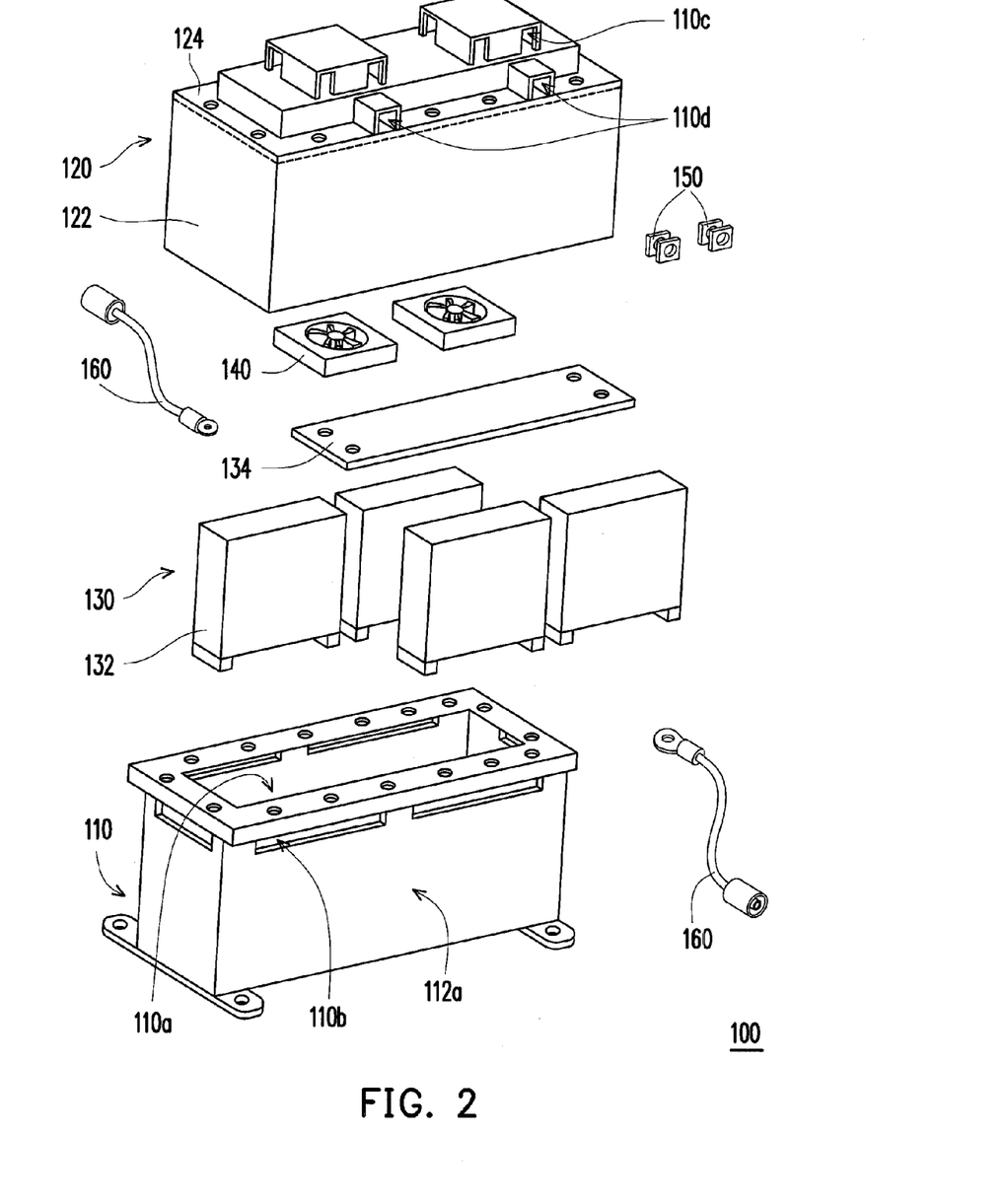
FIG. 2 is an explosive view illustrating some components in the car electric equipment case module depicted in FIG. 1.
Figure 3:
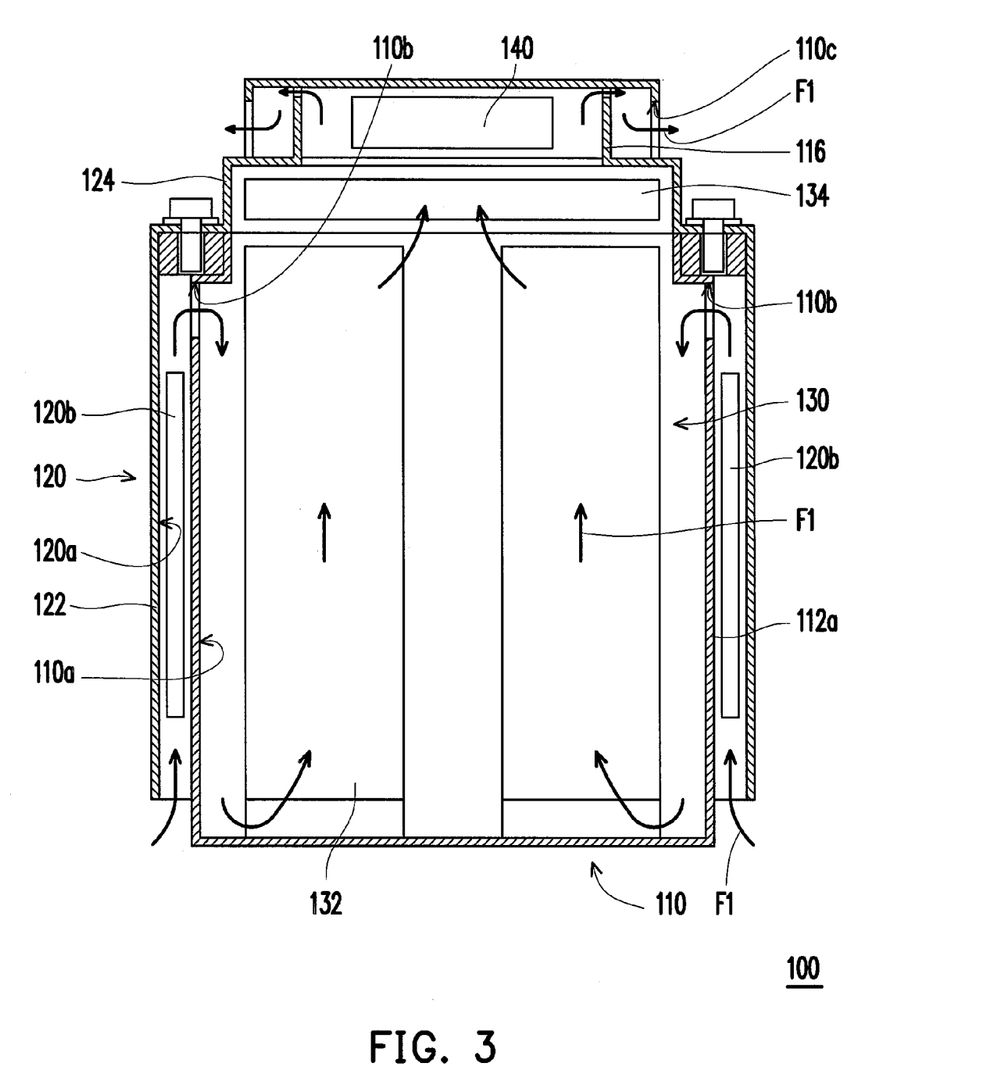
FIG. 3 is a cross-sectional view illustrating the car electric equipment case module depicted in FIG. 1.

FIG. 1 is a three-dimensional view illustrating a car electric equipment case module according to an exemplary embodiment of the disclosure. FIG. 2 is an explosive view illustrating some components in the car electric equipment case module depicted in FIG. 1. FIG. 3 is a cross-sectional view illustrating the car electric equipment case module depicted in FIG. 1. With reference to FIG. 1 to FIG. 3, the car electric equipment case module 100 of this exemplary embodiment includes a housing 110, a covering structure 120, an electric equipment set 130, and a fan 140. The housing 110 has a containing space 110a, a side wall 112a and a first ventilator 110b formed on the side wall 112a. The covering structure 120 includes a casing 124 and a block wall 122. The casing 124 is assembled to the housing 110. The block wall 122 is connected to the casing 124 and extends outside the side wall 112a to cover the first ventilator 110b. There is a gap between the block wall 122 and the side wall 112a to form an air channel 120a connected to the first ventilator 110b. A second ventilator 110c is formed on the covering structure 120. The electric equipment set 130 is configured in the containing space 110a. The fan 140 is configured in the housing 110 and suitable for dissipating heat of the electric equipment set 130 through the forced air cooling. The electric equipment set 130 of this exemplary embodiment is a battery pack, for instance, and includes a plurality of batteries 132 and a circuit board 134 that manages power supply of the batteries 132, which should not be construed as a limitation to the disclosure. In other exemplary embodiments, the electric equipment set 130 can be either a controller set for propelling the automotive motor or any other automotive electronic devices.

As indicated in FIG. 3, the air channel 120a communicates with the first ventilator 110b and the external surroundings. The fan 140 is configured in the housing 110 and aligned to the second ventilator 110c. Besides, the fan 140 is suitable for providing air flow F1. The air flow F1 flows into the containing space 110a through the air channel 120a and the first ventilator 110b and flows out through the second ventilator 110c, for instance, such that the heat of the electric equipment set 130 is dissipated together with the air flow F1 to the external surroundings for heat-dissipating. In other exemplary embodiments of the disclosure, the fan 140 can be disposed on other regions of the housing 110. Additionally, the fan 140 can control the air flow F1 to flow into the containing space 110a through the second ventilator 110c and flow out through the first ventilator 110b and the air channel 120a, which should not be construed as a limitation to the disclosure.

Under said configuration, the air flow F1 can flow into the housing 110 through the air channel 120a and the first ventilator 110b for heat dissipation. The covering structure 120 covers the first ventilator 110b, and thereby the external moisture or dust can be prevented from entering the housing 110 through the first ventilator 110b. As such, the electric equipment set 130 in the housing 110 is less likely to be in contact with the foreign material and is thus not damaged or ineffective. Further, the covering structure 120 achieves water-proof and dust-proof protection, and thus it is not necessary to additionally configure a wind-guiding cover to move the air intake and the air exhaust to other positions which are less likely to be affected by external moisture or dust. Therefore, the configuration space of the entire structure can be economized.

To be more specific, there are a plurality of first ventilators 110b according to this exemplary embodiment. The block wall 122 extends from the peripheries of the casing 124 and surrounds the housing 110, so as to cover all of the first ventilators 110b and allow the air channel 120a to surround and extend from the casing 112. Thereby, the total cross-sectional area of the air channel 120a can be increased, and air circulation efficiency can be improved.

With reference to FIG. 3, the housing 110 has a block plate 116 therein. The block plate 116 is located between the fan 140 and the second ventilator 110c, so as to prevent the external moisture or dust from entering the housing 110 through the second ventilator 110c and being attached to the fan 140. An air filter 120b can be further configured in the air channel 120a, so as to filter the impurities in the external air and protect the electric equipment set 130 in the housing 110 from contamination. The air filter 120b is a meshed filter, an air-ventilating sponge, or any other device suitable for filtering air, for instance.

With reference to FIG. 1 and FIG. 2, the car electric equipment case module 100 described in this exemplary embodiment further includes water-proof elastic elements 150 and wires 160. The covering structure 120 has openings 110d in which the water-proof elastic elements 150 are configured. The wires 160 are connected to the electric equipment set 130. Besides, the wires 160 pass through the water-proof elastic elements 150 and extend from the housing 110, so as to prevent the external moisture from entering the housing 110 through the openings 110d. In this exemplary embodiment, the wires 160 are power connection cords connected to the batteries 132, while the wires 160 in other exemplary embodiments can also be power connection cords connected to the fans 140 or signal lines connected to the circuit board 134, which should not be construed as a limitation to the disclosure.

Figure 4:
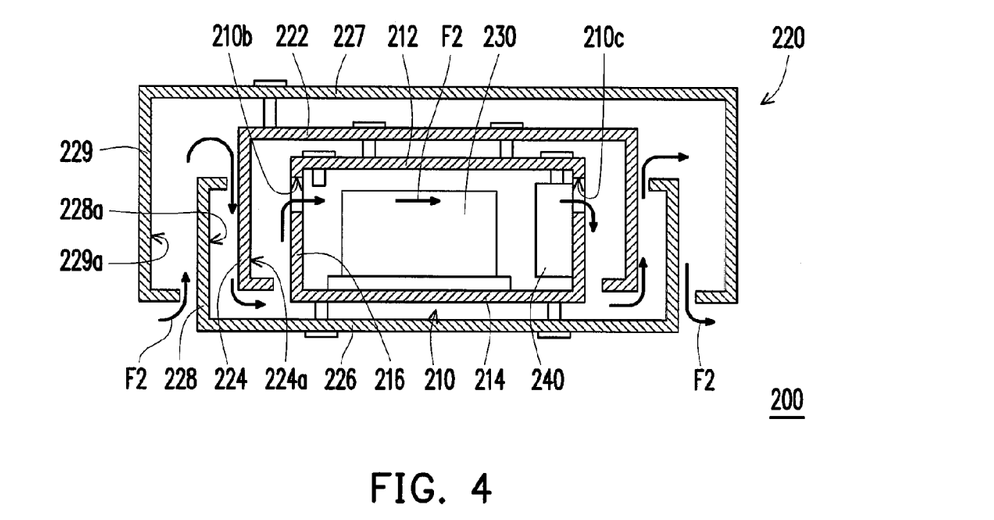
FIG. 4 is a cross-sectional view illustrating a car electric equipment case module according to another exemplary embodiment of the disclosure.

FIG. 4 is a cross-sectional view illustrating a car electric equipment case module according to another exemplary embodiment of the disclosure. With reference to FIG. 4, the car electric equipment case module 200 of this exemplary embodiment includes a housing 210, a covering structure 220, an electric equipment set 230, and a fan 240. The housing 210 has a top wall 212, a bottom wall 214, and a side wall 216 connected between the top wall 212 and the bottom wall 214. The first ventilator 210b is formed on the side wall 216. The electric equipment set 230 and the fan 240 are configured in the housing 210. The covering structure 220 includes a first casing 222, a first block wall 224, a second casing 226, a second block wall 228, a third casing 227, and a third block wall 229. The first casing 222 is assembled to the top wall 212. The first block wall 224 is connected to the first casing 222. Besides, the first block wall 224 extends outside the side wall 216 and covers the first ventilator 210b. The second casing 226 is assembled to the bottom wall 214. The second block wall 228 is connected to the second casing 226 and extends outside the first block wall 224. The third casing 227 is assembled to the first casing 222. The third block wall 229 is connected to the third casing 227 and extends outside the second block wall 228.

Similar to the block wall 122 and the side wall 112a shown in FIG. 3, the first block wall 224 and the side wall 216 of this exemplary embodiment have a gap therebetween, so as to form a first channel 224a between the first block wall 224 and the side wall 216. The first channel 224a communicates with the first ventilator 210b. There is a gap between the second block wall 228 and the first block wall 224, so as to form a second channel 228a between the second block wall 228 and the first block wall 224. The second channel 228a communicates with the first channel 224a. There is a gap between the third block wall 229 and the second block wall 228, so as to form a third channel 229a between the third block wall 229 and the second block wall 228. The third channel 229a communicates with the second channel 228a. The first channel 224a, the second channel 228a, and the third channel 229a together constitute a zigzag air channel, and thereby the external moisture or dust can barely enter the housing 210 through the first ventilator 210b. According to other exemplary embodiments, the covering structure 220 can have more casings and block walls to form the zigzag air channel with more bent portions, so as to better achieve water-proof and dust-proof protection.

The second ventilator 210c and the first ventilator 210b of the housing 210 in this exemplary embodiment respectively communicate with the external surroundings in a similar way, and thus no further descriptions are given herein. An air flow F2 for heat dissipating provided by the fan 240 is suitable for flowing into the housing 210 through the third channel 229a, the second channel 228a, and the first ventilator 210b and flowing out through the second ventilator 210c and the corresponding channel. Thereby, the heat of the electric equipment set 230 can be dissipated together with the air flow F2 to the external surroundings for heat dissipating.

Similar to the block wall 122 and the casing 112 shown in FIG. 1 to FIG. 3, the first block wall 224 of this exemplary embodiment extends from the peripheries of the first casing 222 and surrounds the housing 210. The second block wall 228 extends from the peripheries of the second casing 226 and surrounds the first block wall 224. The third block wall 229 extends from the peripheries of the third casing 227 and surrounds the second block wall 228. Thereby, the total cross-sectional area of the air channel constituted by the first channel 224a, the second channel 228a, and the third channel 229a can be increased, and the air circulation efficiency can also be improved.

Figure 5:
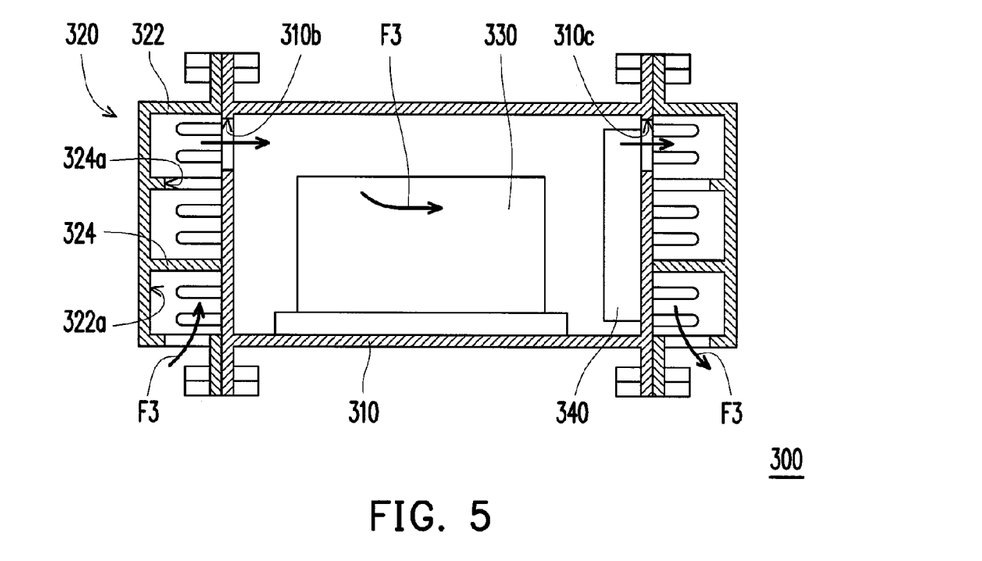
FIG. 5 is a cross-sectional view illustrating a car electric equipment case module according to another exemplary embodiment of the disclosure.
Figure 6:
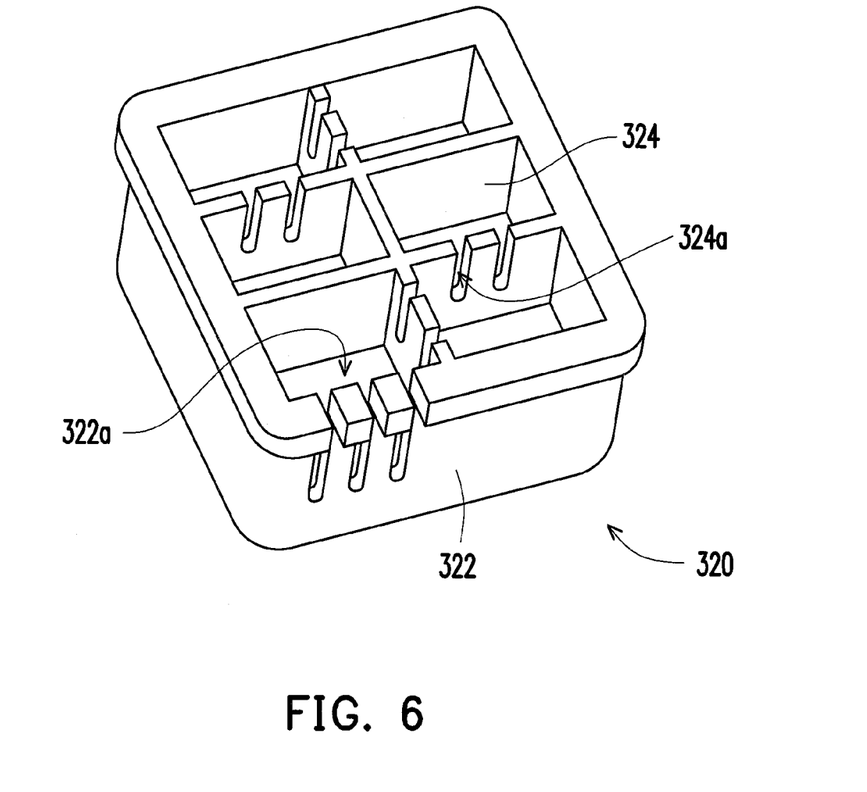
FIG. 6 is a partial three-dimensional view illustrating the covering structure depicted in FIG. 5.

FIG. 5 is a cross-sectional view illustrating a car electric equipment case module according to another exemplary embodiment of the disclosure. FIG. 6 is a partial three-dimensional view illustrating the covering structure depicted in FIG. 5. With reference to FIG. 5 and FIG. 6, the car electric equipment case module 300 of this exemplary embodiment includes a housing 310, a covering structure 320, an electric equipment set 330, and a fan 340. The housing 310 has a first ventilator 310b and a second ventilator 310c. The electric equipment set 330 and the fan 340 are configured in the housing 310. The covering structure 320 also could be composed of a cover 322 and a plurality of partitions 324. The cover 322 is assembled to the housing 310 and covers the first ventilator 310b. The partitions 324 are connected to an inner portion of the cover 322 and divide the inner portion of the cover 322 into a plurality of spaces 322a. One of the spaces 322a communicates with the first ventilator 310b, and another one of the spaces 322a communicates with the external surroundings. Each of the partitions 324 has at least one opening 324a, such that the spaces 322a communicate with one another through the openings 324a and define the air channel communicating with the first ventilator 310b and the external surroundings. The zigzag air channel defined by the partitions 324 in the cover 322 and the openings 324a of the partitions 324 can effectively enhance the water-proof and dust-proof protection.

The cover 322 and the partitions 324 can be made by assembling sheet metal parts, performing a molding process to form an integral structure, or applying any other appropriate method, which should not be construed as a limitation to this disclosure. Besides, the type of the air channel is not restrained in this disclosure. For instance, in other exemplary embodiments of the disclosure, honey-comb shaped openings can be formed in the covering structure, such that the heat-dissipating air can flow through the openings, and the water-proof and dust-proof protection can be enhanced.

The second ventilator 310c and the first ventilator 310b of the housing 310 in this exemplary embodiment respectively communicate with the external surroundings in a similar way, and thus no further descriptions are given herein. An air flow F3 provided by the fan 340 is suitable for flowing into the housing 310 through the first ventilator 310b and the zigzag air channel that is defined by the partitions 324 in the cover 322 and the openings 324a of the partitions 324 and flowing out through the second ventilator 310c and the corresponding zigzag air channel. Thereby, the heat of the electric equipment set 330 can be dissipated together with the air flow F3 to the external surroundings for heat-dissipating.

In light of the foregoing, the car electric equipment case module described in the exemplary embodiments of the disclosure has the covering structure that is connected to the housing, the air channel is formed between the covering structure and the housing, and the covering structure covers the ventilator. Thereby, the air flow can flow into or flow out of the housing through the air channel and the ventilator for heat dissipation. Besides, since the covering structure covers the ventilator, the housing can be protected from external moisture or dust that enters the housing through the ventilator. As such, the electric equipment set in the housing is less likely to be in contact with the foreign material and is thus not damaged or ineffective. Moreover, the covering structure achieves water-proof and dust-proof protection, and thus it is not necessary to additionally configure a wind-guiding cover to move the air intake and the air exhaust to other positions which are less likely to be affected by external moisture or dust. Therefore, the configuration space of the entire structure can be economized.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A car electric equipment case module comprising:
   a housing having a side wall, a containing space and a first ventilator formed on the side wall;
   a covering structure comprising:
      a first casing assembled to the housing; and
      a first block wall connected to the first casing and extending outside the side wall to cover the first ventilator, wherein a gap is between the first block wall and the side wall to form an air channel connected the first ventilator between the first block wall and the side wall;
   an electric equipment set configured in the containing space; and
   a fan configured in the housing, the fan being suitable for providing an air flow, wherein a second ventilator is formed on the housing or the covering structure, the air flow flows into the containing space through the air channel and the first ventilator and flows out through the second ventilator or flows into the containing space through the second ventilator and flows out through the first ventilator and the air channel.

2. The car electric equipment case module as recited in claim 1, wherein the block wall extends from peripheries of the first casing and surrounds the side wall.

3. The car electric equipment case module as recited in claim 1, the covering structure further comprising:
   a second casing assembled to a bottom wall; and
   a second block wall connected to the second casing and extending outside the first block wall, wherein a gap is between the second block wall and the first block wall, so as to form a second channel between the second block wall and the first block wall, the second channel communicating with the first channel.

4. The car electric equipment case module as recited in claim 3, wherein the second block wall extends from peripheries of the second casing and surrounds the first block wall.

5. The car electric equipment case module as recited in claim 3, the covering structure further comprising:
   a third casing assembled to the first casing; and
   a third block wall connected to the third casing and extending outside the second block wall, wherein a gap is between the third block wall and the second block wall, so as to form a third channel between the third block wall and the second block wall, the third channel communicating with the second channel.

6. The car electric equipment case module as recited in claim 5, wherein the third block wall extends from peripheries of the third casing and surrounds the second block wall.

7. The car electric equipment case module as recited in claim 1, wherein the fan is configured in the housing and aligned to the second ventilator, the housing has a block plate therein, and the block plate is located between the fan and the second ventilator.

8. The car electric equipment case module as recited in claim 1, further comprising an air filter configured in the air channel.

9. The car electric equipment case module as recited in claim 1, further comprising:
   a water-proof elastic element, the covering structure having an opening, the water-proof elastic element being configured in the opening of the housing; and
   a wire connected to the electric equipment set, the wire passing through the water-proof elastic element and extending from the housing.

* * * * *